United States Patent [19]
Pollmeier et al.

[11] 3,815,073
[45] June 4, 1974

[54] ELECTRICAL FUSE
[75] Inventors: Franz-Josef Pollmeier; Paul Müller, both of Berlin, Germany
[73] Assignee: Siemens Aktiengesellschaft, Munich, Germany
[22] Filed: Oct. 12, 1972
[21] Appl. No.: 296,749

[30] Foreign Application Priority Data
Oct. 21, 1971 Germany.................... 2153012

[52] U.S. Cl................ 337/295, 317/247, 337/159, 337/231, 337/276, 337/290
[51] Int. Cl. .......................................... H01h 85/04
[58] Field of Search .......... 337/227, 228, 231, 204, 337/276, 290, 295, 277, 297, 159; 317/247, 256

[56] References Cited
UNITED STATES PATENTS
| | | | |
|---|---|---|---|
| 526,502 | 9/1894 | Rau | 337/290 |
| 2,677,737 | 5/1954 | Exner | 337/227 X |
| 2,828,390 | 3/1958 | McAlister | 337/295 X |
| 3,267,240 | 8/1966 | Fitzgerald | 337/297 |
| 3,374,330 | 3/1968 | Cameron | 337/231 |
| 3,614,699 | 10/1971 | Fister | 337/231 X |

FOREIGN PATENTS OR APPLICATIONS
| | | | |
|---|---|---|---|
| 777,125 | 6/1957 | Great Britain | |
| 149,551 | 12/1952 | Australia | 337/277 |
| 204,008 | 11/1956 | Australia | 337/277 |

*Primary Examiner*—Bernard A. Gilheany
*Assistant Examiner*—Fred E. Bell
*Attorney, Agent, or Firm*—Kenyon & Kenyon Reilly Carr & Chapin

[57] ABSTRACT

A fuse for protecting high voltage circuit elements, particularly capacitor units, the fuse elements including a conductive fuse wire wound in a helical configuration and enclosing thereby a hollow core. In a preferred embodiment, the coiled helix has a length which is approximately half the total length of fuse wire therein.

8 Claims, 3 Drawing Figures

ELECTRICAL FUSE

BACKGROUND OF THE INVENTION

1. Field of the Invention

This invention relates to the field of electrical fuses, and particularly to electrical fuse apparatus for use in protecting capacitor units which operate at high electrical potential.

2. Discussion of the Prior Art

It is well known to provide fuse elements to protect high voltage electrical circuit elements from fault currents which may arise therein, and which, if unchecked, can cause massive damage to the circuit elements. With respect to high voltage capacitor units, often of the liquid filled variety, it is common to provide each of the capacitive elements in the unit with a fuse which serves to cut out and thereby protect any individual capacitive element which develops an excessive fault current during operation. This arrangement is desirable because both the entire capacitive unit and the faulty element can be protected if excessive current flow occurs, while still permiting the capacitive unit to remain operative.

The normal manner of connecting a fuse in a high voltage capacitor unit is to interpose it between one electrode of the capacitive element to be protected and a main bus of the capacitive unit. Such fuses are sometimes called "winding" or "internal" fuses.

One form of such a fuse is disclosed in German Published Pat. application No. 2,015,860. In that publication, there is shown a fuse which includes as its principal element conductive strip or wire which is configured in a serpentine fashion, having multiple curves successively bending in opposite direction long the length of the conductive element. The entire conductive wire or strip is disposed essentially in one plane.

An advantage of a fuse element of this type is that, on the appearance of an excessive fault current running therethrough, the breaking of the arc is assisted by a "magnetic blast" effect. The current passing through the conductive element establishes magnetic fields in the region thereof, which fields assist in directing the ionized products of the arc away from the terminals of the conductive strip, thus tending to lengthen the arc to such a degree that the potential between the terminals is unable to maintain it. Moreover, the magnetic field involved tends to straighten and extend the length of the conductive element on its breakdown, further contributing to the lengthening of the arc. These phenomona enable the fuse to be used at higher potentials than if they did not exist.

Despite its advantages, some difficulties and disadvantages have been encountered in connection with fuses of this type. The serpentine configuration of the conductive element disposed in one plane is mechanically unstable. Consequently, it is often necessary to provide elaborate insulating brackets between the successive curves of the conductive element, in order to impart a degree of mechanical stability which is consistent with that required in manufacturing circuit elements incorporating such fuses on a mass production basis.

Moreover, the disposition of the conductive element in only one plane limits excessively the length of the conductive element which can be employed in a given physical volume, thus limiting to an objectionable degree the compactness of fuses made in accordance with German Pat. application No. 2,015,860. Furthermore, the necessity for employing insulating strips between the successive curves of the prior art fuse renders such apparatus relatively expensive to manufacture.

Accordingly, it is a purpose of this invention to provide an electrical fuse element which, while incorporationg the advantages of the magnetic blast effect, is inherently mechanically stable and inexpensive to manufacture.

A further object of this invention is to provide such an electrical fuse element which is capable of operation at extremely high electrical potentials.

It is a further object of this invention to provide an electrical fuse element which incorporates the above advantages, and which is nonetheless compact and inexpensive to manufacutre.

SUMMARY OF THE INVENTION

Prior art electrical fuse elements, such as those described hereinabove, may be improved upon by this invention, which includes winding the conductive element in the form of a helix such that it encloses a generally cylindrical hollow core. A helical wire or strip is inherently easy to manufacture, and is mechanically stable. Mechanical stability can be further enhanced by placing an insulating element having a cylindrical rod form in the hollow core defined by the helical conductor. Alternately, the helix can be placed within a tube made of insulating material, with similar enhancement of mechanical rigidity.

In still another application, the helical conductor can be supported at its end terminals by a generally U-shaped bracket of insulating material, with the attendant effect that the entire conductive element can be surrounded by the insulating liquid present in liquid filled electrical units in which the fuse of the present invention is employed.

It is evident that by the use of a helical configuration a relatively long length of conductive wire or striping can be disposed in a physically small volume, with consequent advantages of compactness of the fuse element.

It is noteworthy that it has surprisingly been observed that a fuse made in accordance with the present invention can protect circuit elements in environments of particularly high maximum potential when the helix is wound such that the total length of wire comprising the helix is approximately twice the length of the coiled helix itself.

DESCRIPTION OF THE PREFERRED EMBODIMENT

A typical electrical capacitor unit includes several flat elements 1 (FIG. 1) within a housing which is often filled with an insulating liquid, such as a halogenized hydrocarbon or mineral oil. Each capacitor element is equipped with a fuse 2.

Figure 1:
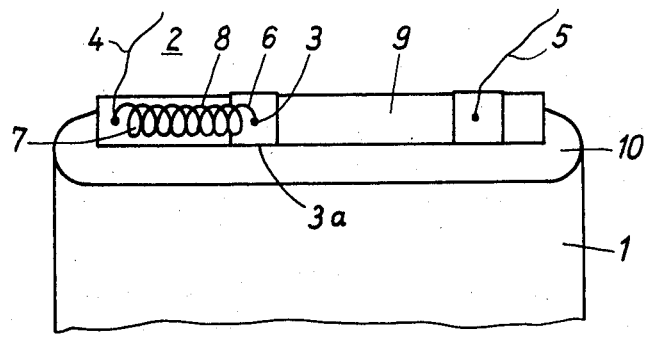
FIG. 1 is an elevational view showing a fuse constructed in accordance with the present invention employed in connection with a capacitive element of a capacitive unit.

As shown in FIG. 1, one terminal 3 of the fuse is connected to a first electrode 3a of a capacitor element, and the opposite end is connected, via lead 4, to a bus which ties together all the capacitor elements within the unit in parallel or in series, and which ultimately leads to one terminal of the entire capacitive unit. The remaining electrode of the capacitor element 1 with which fuse 2 is associated is brought out by way of lead 5.

The fuse of this invention is made from a thin metallic fuse wire 6. Fuse wire 6 may consist of conductive material such as silver or copper, or a metallic resistance material. Fuse wire 6 is formed in the shape of a helix 8 which encloses and defines an inner hollow space or core 7. A relatively long length of fuse wire 6 can be accommodated within a small physical volume.

The helical configuration of the fuse wire provides a magnetic blast effect which is remarkably superior to that of the prior art fuses. Consequently, the fuse of this invention is capable of operation at significantly higher maximum voltages than are prior art devices.

In a preferred embodiment, the helix is coiled such that the total length of fuse wire in the helix is approximately twice the length of the coiled helix. This embodiment is particularly preferred because it has unexpectedly been observed that, when the helix is wound in this configuration, the maximum voltages with which the fuse thereby constructed can be used is much greater than with other helical ratios.

A helix wound in such a fashion possesses inherent mechanical stability and strength, and is therefore easy to handle in mass production techniques, where rapid movement and insertion is desirable. It is further noteworthy that the helical configuration of fuse wire itself is easily and quickly manufactured.

In the embodiment shown in FIG. 1, fuse 2 is fastened to insulating board 9, which protrudes beyond the end face 10 of capacitor element 1. Board 9 serves to maintain the leads leading to the fuse terminals and to the electrodes of the capacitor element in a fixed location, and adds rigidity to the entire fuse structure.

Figure 2:
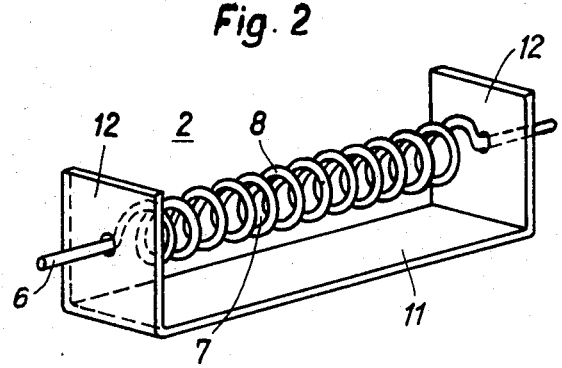
FIG. 2 is a perspective view of a fuse of the present invention supported by a U-shaped insulating carrier bracket.

FIG 2 shows a modification of the structural configuration of fuse 2 such that the helix is arranged, freely suspended, in a U-shaped carrier bracket 11. Carrier bracket 11 is made of a suitable insulating material having sufficient mechanical strength for the particular application desired. Helix 8 of fuse 2 is thus supported between the upwardly bent legs 12 of carrier 11. An advantage of this arrangement is that helix 8, when submerged in the liquid of liquid filled capacitor units, is exposed on all sides to the insulating liquid, thus enhancing the capabilities of the fuse in high voltage application.

Although the end face of the capacitor element is a common mounting location for the carrier bracket 11, it can also be placed along a lateral surface thereof, or in the spaces between the individual elements. In some circumstances, it is even possible to mount the carrier bearing the fuse within the capacitor element.

Figure 3:
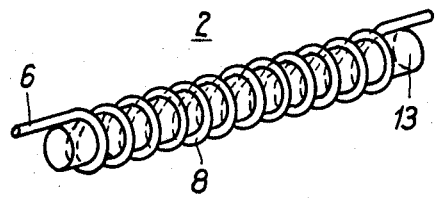
FIG. 3 is a perspective view of an additional embodiment of the fuse of this invention showing a cylindrical insulating rod element inserted in the hollow core defined by the helix.

A further modification of the fuse of this invention is shown in FIG. 3. In this embodiment, the hollow core 7 is provided with a cylindrical rod 13 of insulating material. The purpose of inserting such material within core 7 is to enhance the mechanical rigidity of the fuse 2. Another alternative is to enclose the helix 8 with a tube made of insulating material. The tube or cylindrical rod may also be of resilient quality, should the mechanical circumstances make such a property advantageous. A material such as fabric or fiber strands can fulfill this requirement.

It is evident from the foregoing that the fuse of this invention successfully improves upon the high voltage capabilities and magnetic blast advantages of prior art internal or winding fuses for use in capacitive and other systems, and has advantages of greater ease of manufacture, mechanical strength, compactness and economy which have heretofore been less readily achievable in such fuse apparatus. The disclosure set forth herein is intended to be illustrative rather than exhaustive, and it is noted that one of ordinary skill in the relevant art may make additional modifications or changes in the disclosed embodiments without departing from the spirit of the invention disclosed.

What is claimed is:

1. An electrical fuse apparatus comprising:
an elongated portion of conductive fuse material wound in a helical configuration and having terminals associated therewith for electrically connecting said fuse material in an electrical circuit comprising a circuit element to be protected by said fuse, the helix formed by said helically wound fuse material having a coiled length approximately half the length of the total length of said portion of said fuse material.

2. The fuse of claim 1, further comprising:
a carrier bracket made of insulating material and having means for supportively suspending said fuse material,
whereby, when said fuse material is suspended on said carrier bracket and immersed in a liquid, the liquid contacts virtually the entire surface of said fuse material.

3. The fuse of claim 2, said carrier bracket being of a U-shaped configuration.

4. The fuse of claim 1, further comprising:
a rod of insulating material and being insertable into the core of said helically wound fuse material, whereby the mechanical rigidity of said fuse is enhanced.

5. The fuse of claim 4, said rod being flexibly resilient.

6. The fuse of claim 1, further comprising a tubular insulating element being suitable to accommodate in its bore said helically wound fuse material, whereby the mechanical rigidity of said fuse is enhanced.

7. The fuse of claim 6, said tubular insulating element being flexibly resilient.

8. In an electrical capacitor unit having at least one capacitor element disposed within a housing containing insulating liquid, each capacitor element being connected to an internal fuse having one end thereof connected to the capacitor element, the other end thereof being connected with a bus of the capacitor unit, the fuse including an elongated portion of conductive fuse material, the improvement comprising:
the conductive fuse material being wound into a helical configuration and thereby defining a helix having a hollow core, the helix formed by said fuse material having a coiled length approximately half the length of the total length of the fuse material, whereby the mechanical strength and the magnetic blast effect of said fuse is enhanced.

* * * * *